(12) United States Patent
Miller

(10) Patent No.: US 6,553,446 B1
(45) Date of Patent: Apr. 22, 2003

(54) MODULAR INPUT/OUTPUT CONTROLLER CAPABLE OF ROUTING PACKETS OVER BUSSES OPERATING AT DIFFERENT SPEEDS

(75) Inventor: Steven Miller, Livermore, CA (US)

(73) Assignee: Silicon Graphics Inc., Mountain View, CA (US)

( * ) Notice: Subject to any disclaimer, the term of this patent is extended or adjusted under 35 U.S.C. 154(b) by 0 days.

(21) Appl. No.: 09/409,299

(22) Filed: Sep. 29, 1999

(51) Int. Cl.[7] .................................................. G06F 1/00
(52) U.S. Cl. ...................... 710/307; 710/306; 710/309; 710/310; 710/316
(58) Field of Search ................................. 710/305–307, 710/311, 309, 313, 310, 316, 2, 3, 14, 33, 34, 35, 52, 60, 61, 107, 110, 112, 113

(56) References Cited

U.S. PATENT DOCUMENTS

| | | | | |
|---|---|---|---|---|
| 5,191,653 A | * | 3/1993 | Banks et al. ................. | 710/304 |
| 5,717,875 A | * | 2/1998 | Cutleywala et al. ........ | 710/313 |
| 5,915,104 A | | 6/1999 | Miller ......................... | 395/309 |
| 5,916,312 A | * | 6/1999 | Phung et al. ................ | 710/311 |
| 5,941,968 A | * | 8/1999 | Mergard et al. ............. | 710/304 |
| 6,006,296 A | * | 12/1999 | Gold et al. .................. | 710/100 |
| 6,067,595 A | * | 5/2000 | Lindenstruth ............... | 710/313 |
| 6,073,201 A | * | 6/2000 | Jolley et al. ................ | 710/311 |
| 6,185,520 B1 | * | 2/2001 | Brown et al. ................. | 703/25 |
| 6,233,641 B1 | * | 5/2001 | Graham et al. ............. | 710/316 |
| 6,311,245 B1 | * | 10/2001 | Klein .......................... | 710/304 |

FOREIGN PATENT DOCUMENTS

| | | | | |
|---|---|---|---|---|
| WO | | 98/12845 | 3/1998 | ........... H04L/12/56 |

* cited by examiner

Primary Examiner—Mark H. Rinehart
Assistant Examiner—Raymond N Phan
(74) Attorney, Agent, or Firm—Schwegman, Lundberg, Woessner & Kluth, P.A.

(57) ABSTRACT

A modular, scalable high-bandwidth computer architecture. A single integrated router/bridge ASIC defines a family of peripheral controllers that accept high-speed packet switched data, either for routing to other, identical controllers, or for routing to on-board PCI buses, or a combination of the two destinations, depending on the number of ASICs employed and their selectable configuration.

8 Claims, 12 Drawing Sheets

MODULAR INPUT/OUTPUT CONTROLLER CAPABLE OF ROUTING PACKETS OVER BUSSES OPERATING AT DIFFERENT SPEEDS

TECHNICAL FIELD

This invention involves a scalable, modular approach to input/output management in a computer system. In particular, the approach integrates packet switched router architecture with high bandwidth bridges to low bandwidth peripheral buses. The former provides simultaneous point-to-point communications between multiple devices of the computer system, while the latter minimizes memory latencies for optimal system performance.

BACKGROUND

In the past, computers were primarily applied to processing rather mundane, repetitive numerical and/or textual tasks involving number-crunching, spread sheeting, and word processing. These simple tasks merely entailed entering data from a keyboard, processing the data according to some computer program, and then displaying the resulting text or numbers on a computer monitor and perhaps later storing these results in a magnetic disk drive. However, today's computer systems are much more advanced, versatile, and sophisticated. Especially since the advent of digital media applications and the Internet, computers are now commonly called upon to accept and process data from a wide variety of different formats ranging from audio to video and even realistic computer-generated three-dimensional graphic images. A partial list of applications involving these digital media applications include the generation of special effects for movies, computer animation, real-time simulations, video teleconferencing, Internetrelated applications, computer games, telecommuting, virtual reality, high-speed databases, real-time interactive simulations, medical diagnostic imaging, etc.

The reason behind the proliferation of digital media applications is due to the fact that much more information can be conveyed and readily comprehended with pictures and sounds rather than with text or numbers. Video, audio, and three dimensional graphics render a computer system more user friendly, dynamic, and realistic. However, the added degree of complexity for the design of new generations of computer systems necessary for processing these digital media applications is tremendous. The ability of handling digitized audio, video, and graphics requires that vast amounts of data be processed at extremely fast speeds. An incredible amount of data must be processed every second in order to produce smooth, fluid, and realistic full-motion displays on a computer screen. Additional speed and processing power is needed in order to provide the computer system with high-fidelity stereo sound and real-time, and interactive capabilities. Otherwise, if the computer system is too slow to handle the requisite amount of data, its rendered images would tend to be small, grainy and otherwise blurry.

Furthermore, movement in these images would likely be jerky and disjointed because its update rate is too slow. Sometimes, entire video frames might be dropped. Hence, speed is of the essence in designing modern, state-of-the-art computer systems.

One of the major bottlenecks in designing fast, high performance computer systems pertains to the current bus architecture. A "bus" is comprised of a set of wires that is used to electrically interconnect the various semiconductor chips and input/output devices of the computer system. Electric signals are conducted over the bus so that the various components can communicate with each other. Virtually all of today's computer systems use this same type of busing scheme. A single bus is used to electrically interconnect the central processing unit (CPU) with the memory (e.g., RAM) via a memory controller. Furthermore, other various devices are also coupled to the bus. The bus is comprised of a set of physical wires which are used to convey digital data, address information for specifying the destination of the data, control signals, and timing/clock signals. For instance, the CPU may generate a request to retrieve certain data stored in the memory. This read request is then sent over the bus to the memory controller. Upon receipt of this read request, the memory controller fetches the desired data from memory and sends it back over the bus to the CPU. Once the CPU is finished processing the data, it can be sent via the bus for output by a device (e.g., fax, modem, network controller, storage device, audio/video driver, etc.).

The major drawback to this prior art bus architecture is the fact that it is a "shared" arrangement. All of the components share the same bus. They all rely on a single bus to meet their individual communication needs.

However, the bus can only establish communications between two of these devices at any given time. Hence, if the bus is currently busy transmitting signals between two of the devices (e.g., the CPU and another device), then all the other devices (e.g., memory) must wait their turn until that transaction is complete and the bus again becomes available. If a conflict arises, an arbitration circuit, usually residing in the memory controller, resolves which of the devices gets priority of access to the bus.

Essentially, the bus is analogous to a telephone "party" line, whereby only one conversation can take place amongst a host of different handsets serviced by the party line. If the party line is currently busy, one must wait until the prior parties hang up, before one can initiate their own call.

In the past, this type of bus architecture offered a simple, efficient, and cost-effective method of transmitting data. For a time, it was also sufficient to handle the trickle of data flowing between the various devices residing within the computer system. However, as the demand for increased amounts of data skyrocketed, designers had to find ways to improve the speed at which bits of data can be conveyed (i.e., increased "bandwidth") over the bus. One temporary solution was to increase the width of the bus by adding more wires. The effect is analogous to replacing a two-lane road with a ten-lane super freeway. However, the increase in bus width consumes valuable space on an already densely packed and overcrowded printed circuit board. Furthermore, each of the semiconductor chips connected to the bus must have an equivalent amount of pins to match the increased bus width for accepting and outputting its signals. These additional pins significantly increase the size of the chips. It becomes more difficult to fit these chips onto the printed circuit boards. Furthermore, the practical limitation for cost effective chips and packages impose a physical restriction on the chip's overall size and its number of pins. Today's buses are typically limited to being 64-bits wide. In other words, 64 bits of data or address can be sent simultaneously in parallel over 64 separate wires. The next step of increasing the bus width to 128 bits wide has become impractical.

Another temporary solution to the bandwidth problem was to increase the rate (i.e., frequency) at which data is sent over the bus. However, the physics associated with implementing long sets of parallel wires with multiple loads produces a wide range of problems such as impedance, mismatches, reflections, crosstalk, noise, non-linearities, attenuations, distortions, timing, etc. These problems become even more severe as the frequency increases. It has come to a point where the highest attainable frequency is approximately 33–50 MHz. Higher frequencies cannot be attained without fine tuning, extremely tight tolerances, exotic micro-strip layouts, and extensive testing. It is extremely difficult to reliably mass produce such high frequency computers.

Given a 64-bit bus running at 50 MHz, the highest attainable data rate for a typical computer system is 400 Mbytes per second. Although this data rate appears to be quite impressive, it is nevertheless fast becoming insufficient to meet the demands imposed by tomorrow's new applications. Thus, there is a great need for some type of bus scheme that provides increased throughput.

A specific example of a bottleneck in attaining faster, greater bandwidth computer systems is the standard bus architecture found in most personal computers today, the Peripheral Component Interconnect (PCI) bus. This type of bus architecture offers a simple, efficient, and cost-effective method of transmitting data. For a time, it was also sufficient to handle the amount of data flowing between the various devices residing within the computer system. However, as the demand for increased amounts of data skyrocket, the PCI bus is rapidly becoming inadequate to handle the increase in data transmissions.

In light of the shortcomings inherent to the PCI bus architecture, designers have to find ways to improve the speed at which bits of data can be conveyed. For example, one such solution is to implement a switched router as described in International Patent Application Number PCT/US/14321 entitled "Packet Switched Router Architecture For Providing Multiple Simultaneous Communications," published Mar. 26, 1998 and assigned to the assignee of the present invention. Rather than having a shared bus arrangement, a central "switchboard" arrangement is used to select and establish temporary links between multiple devices. Packets of data are then sent over the links. By selecting and establishing multiple links, the central switchboard allows multiple packets to be simultaneously sent to various destinations. This results in significantly greater bandwidth. There exist many different, improved bus architectures to meet the high bandwidth requirements.

However, a common problem with any new bus architecture is that various peripheral devices designed specifically for connection to a PCI bus are now rendered incompatible. Existing PCI devices (e.g., modems, disk drives, network controllers, printers, etc.) are designed specifically for a PCI type bus scheme. As such, they are incompatible with and cannot be connected to any non-PCI based bus design. Of course, the computer industry could establish a new, faster bus standard. However, this is a lengthy, complicated, highly contentious, and extremely expensive process. The entire computer industry would have to make a wholesale switch over to the new bus standard. And until a new bus standard is adopted, computer manufacturers are hobbled by the outdated PCI bus architecture.

An alternative option is to implement a PCI bus in conjunction with a new, faster bus architecture (e.g., a packet switched router architecture). A bridge device is interposed between the two different bus schemes and acts as an interface. This approach works fine, except that an extra delay is incurred when data is routed through the bridge. In particular, the main memory and CPU are coupled to the new bus structure on one side of the bridge to take advantage of its higher bandwidth, whereas the PCI devices are coupled to the PCI bus on the other side of the bridge. Consequently, read/write operations involving PCI devices require that data be routed to/from a PCI device via the PCI bus, through the bridge, to the new bus, and to/from the main memory. These memory accesses through the bridge result in added memory latencies. The extra memory latencies associated with the bridge may exceed the tolerances of some PCI devices. Thus, there is a need for some mechanism to hide or minimize this memory latency so that high speed PCI devices may be serviced.

U.S. Pat. No. 5,915,104, assigned to the assignee of the present invention, provides a novel, effective solution for minimizing latencies in a way that allows standard PCI devices to operate and yet keeps up with higher data rates. It does so by implementing a combination of special write gathering/buffering, read prefetching/buffering, flushing, interrupt, and virtual device operations.

SUMMARY OF THE INVENTION

One embodiment of the invention is a bi-modal peripheral controller for a computer system, comprising a single ASIC combination of: at least two high-speed buses; at least one low-speed bus; a packet switched router providing a plurality of communication paths permitting simultaneous multiple communications between any of the high-speed or low-speed buses, a bridge coupled between the routing mechanism and each low-speed bus; a plurality of write buffers, coupled to each bridge, which couple a plurality of write transactions on the low-speed bus coupled to that bridge into a cache line sized transfer to the router; a plurality of read buffers, coupled to each bridge, in which each buffer stores fetched data according to a read request from a device connected to the low-speed bus coupled to that bridge so that the device can access the read buffers multiple times to retrieve the data; a prefetcher, coupled to each bridge, which reads sequential cache lines until the read buffers are full, a page boundary is encountered, or the read buffers are caused to be flushed, if the device connected to the low-speed device coupled to that bridge generates a read request and there is no corresponding data contained in the read buffers; and means for selecting between first and second modes. The ASIC permits transfer of data from a first of the high-speed or low-speed buses to a second of the high-speed or low-speed buses. The first mode of the ASIC permits the router to connect any high-speed bus to any other bus, and the second mode of the ASIC permits the router to connect high-speed buses only to low-speed buses.

In one preferred embodiment, the means for selecting between first and second modes comprises enabling or disabling a clock to the packet switched router, such that when the clock is disabled each bridge coupled to a low-speed bus is directly connected to a high-speed bus. In another preferred embodiment, at least one of the high-speed buses employs differential signaling and at least another of the high speed buses does not.

Another embodiment of the invention is a set of peripheral controllers, each of which comprises at least one bi-modal ASIC. The bi-modal ASIC comprises at least two high-speed buses; at least one low-speed bus; means for routing packet switched data from a first of the high-speed or low-speed buses to a second of the high-speed or low-speed buses; means for compensating for memory latency between the low-speed bus and either high-speed bus; and means for selecting between first and second modes. The first mode of the ASIC permits the routing means to connect any high-speed bus to any other bus, and the second mode of the ASIC permits the routing means to connect high-speed buses only to low-speed buses. In one preferred embodiment, at least one of the high-speed buses employs differential signaling and at least another of the high speed buses does not.

Another embodiment of the invention is a peripheral controller for a computer system comprising a plurality of identical bi-modal ASICs, at least two high-speed buses, at least one low-speed bus, means for routing packet switched data from a first of the high-speed or low-speed buses to a second of the high-speed or low-speed buses, and means for compensating for memory latency between the low-speed bus and either high-speed bus. One ASIC is in a mode that permits the routing means to connect any high-speed bus to any other bus, while all other ASICs are in a mode that permits the routing means to connect high-speed buses only to low-speed buses. In one preferred embodiment, the there are three identical bi-modal ASICs. In another preferred embodiment, at least one of the high-speed buses employs differential signaling and at least another of the high speed buses does not.

DETAILED DESCRIPTION

Figure 1:
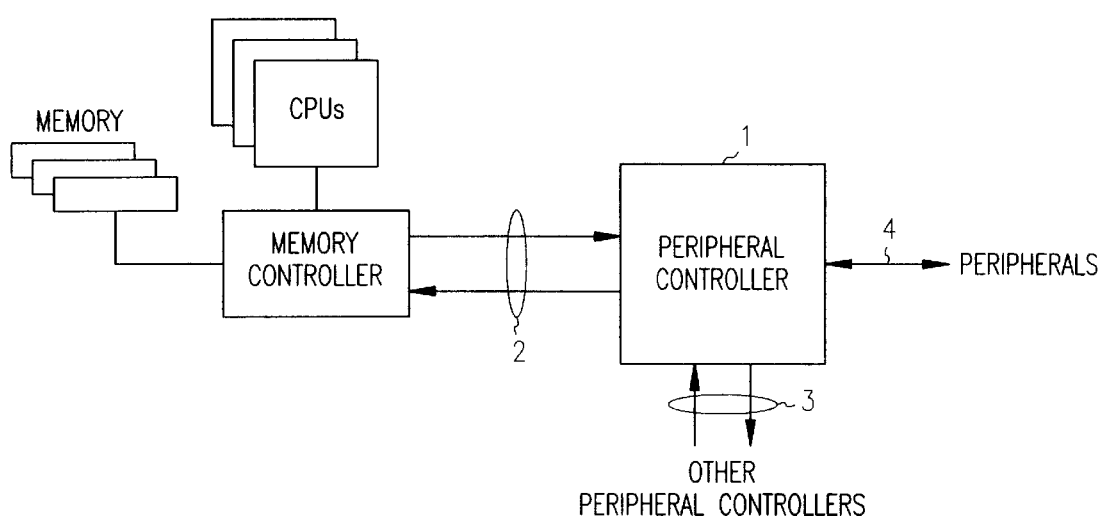
FIG. 1 is a block diagram of a computer system incorporating the invention.

FIG. 1 is a block diagram of a computer system incorporating the invention. The memory, central processing units (CPUs) and memory controller are all conventional with respect to the invention, as the invention pertains to the implementation of peripheral controller 1. The preferred architecture of the computer system consists of one or more processor/memory nodes connected with a general interconnect network whose bandwidth scales with the number of processors. All input/output connectivity to the CPU/memory nodes is through the multiple dedicated purpose high-speed links indicated together as 2. The single peripheral controller 1 can communicate with multiple, identical other peripheral controllers. It does this through the multiple high-speed links indicated together as 3. In addition, the peripheral controller 1 can support multiple peripheral buses, through the multiple lower speed links indicated together as 4.

As will be discussed in more detail below, the flexibility of peripheral controller 1 permits multiple CPU/memory connections to multiple peripheral buses (and thus to all peripherals connected to the system), tightly integrated with the ability to scale up the number of peripheral controllers 1 (and thus the number of peripheral buses) to larger installations. In doing so, peripheral controller 1 enables any CPU/memory node, or any peripheral, to communicate with any peripheral in the system, despite the fact that both high-speed and lower-speed links are required. The first capability is important because the growth rate in the amount of data being stored and processed by sophisticated computer systems is much greater than the rate at which it is economically feasible to replace computer systems wholesale. Thus, systems must be able to scale in physical terms by addition of subsystems such as peripherals, peripheral controllers, etc. without loss of functionality. The second capability is important because commercially feasible peripherals use older, slower, but firmly entrenched protocols that cannot be abandoned but are not directly compatible with the high-speed links required for effective performance of the CPU/memory nodes.

Figure 2:
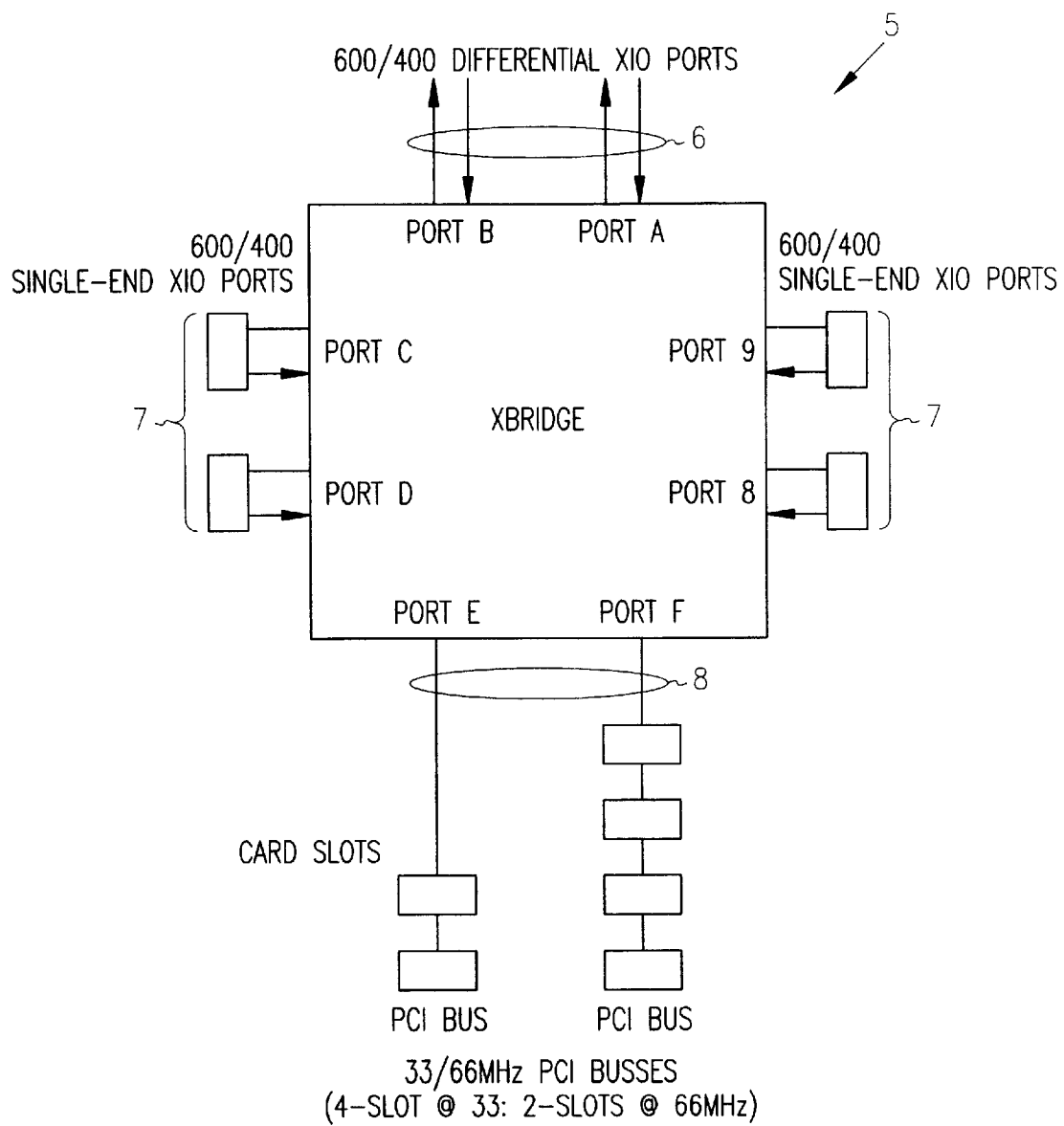
FIG. 2 is a block diagram of a preferred embodiment of the invention.

FIG. 2 is a block diagram of a preferred embodiment of the peripheral controller, implemented in the form of an application specific integrated circuit (ASIC) known as XBridge 5. XBridge 5 is also supported by appropriate power supplies and other conventional functions not critical to the scope of the invention and therefore not shown in FIG. 2. It should be understood that the following description of the preferred embodiment is exemplary only and not limiting of the invention unless specifically so indicated.

High-speed communication ports A and B provide a communication path 6. Each of the two ports is independent from the other, although they preferably support dual porting. Dual porting allows a doubling of the available bandwidth and provides redundant paths to communication, thereby allowing resiliency in the face of component failure. In the preferred embodiment, dual porting to the CPU/memory nodes (not shown) is preferred, but in some embodiments it may be desireable to have only a single connection to the CPU/memory nodes and use the other port to support other devices such as dedicated graphics controller subsystems (not shown). Each port supports packet-switched communication at 600 or 400 Mbaud, and employs differential signaling so that communications can be implemented on separate cables.

Four high-speed ports indicated collectively as 7 and labeled individually as C, D, 8 and 9 represent the links between the XBridge 5 and other peripheral controllers. They are similar to ports A and B except that they are single ended to support on-board communication as will be discussed further below.

Two PCI Bus ports indicated collectively as 8 and labelled individually as E and F represent the links between the XBridge 5 and peripherals themselves. Each of these links, as required for compatibility with the PCI standard, has relatively low bandwidth and can be configured either as two-slot 33 MHz or 66 MHz bus (e.g., Port E), or a four-slot 33 MHz bus (e.g., Port F).

The specific number of high-speed differential signaling ports (two in this preferred embodiment) is not a limitation on the scope of the invention, nor is the specific number of high-speed single-ended ports (four in this preferred embodiment), or the number, type, speed, or configuration of the PCI ports. In fact, the choice of the PCI standard as opposed to any other standard for peripherals is not a limitation on the scope of the invention. Similarly, the choice of single-ended or differential signaling for any particular port is not a limitation on the scope of the invention.

The single ASIC implementation of FIG. 2 provides a significant degree of flexibility to the peripheral controller. It is possible to implement a wide variety of I/O architectures using one or more identical XBridge ASICs 5 (either connected together on a common circuit board or in a motherboard-daughterboard arrangement).

Each XBridge ASIC can be configured in one of two modes. The designation of mode is done by providing the XBridge ASIC with any convenient means for selecting among two modes, preferably a bridge mode select pin that supports the binary choice of either SuperBridge Mode or XBridge Mode. These modes are described below in conjunction with three preferred combinations of XBridge ASICs that are possible given these two modes of operation.

Figure 3:
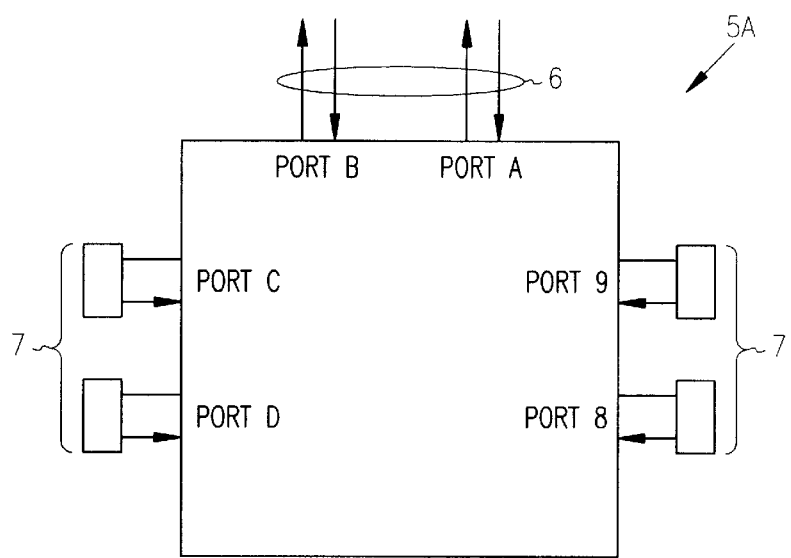
FIGS. 3–5 are a block diagrams of three preferred implementations of the invention.

FIG. 3 is a block diagram of the first of the three preferred implementations of the XBridge ASIC, specifically an embodiment nicknamed "X" that is preferred for expansion purposes. In this embodiment, the ASIC 5a is in a mode known as XBridge Mode. The PCI buses are not used. The two high-speed differential signalling ports A and B communicate with the CPU/memory nodes, and the four high-speed single-ended ports C, D, 8, 9 communicate with the other peripheral controllers (not shown) that represent the expansion of the system.

Figure 4:
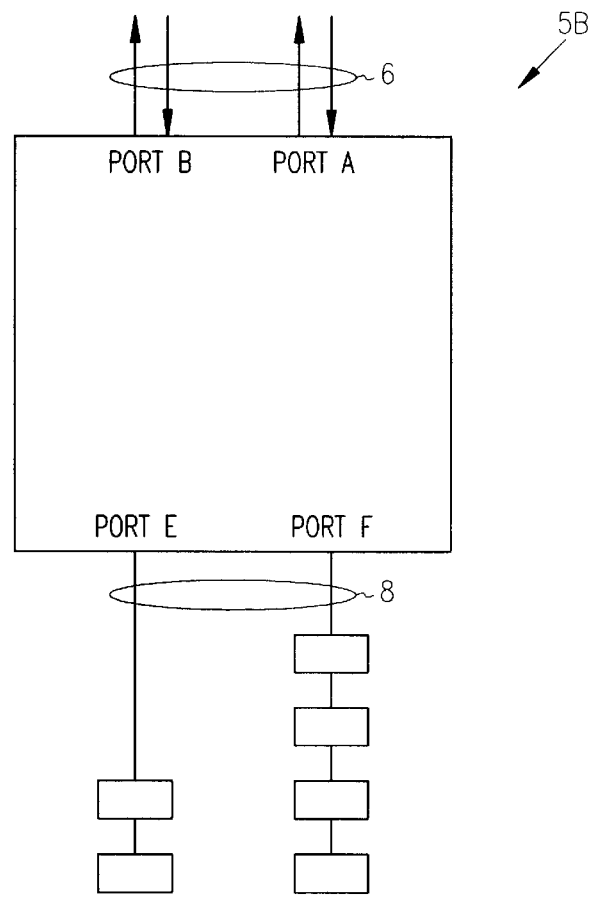

FIG. 4 is a block diagram of the second of three preferred implementations. In this "I" embodiment, the ASIC 5b is in a mode known as XBridge Mode. As before, the two high-speed differential signalling ports A and B communicate with the CPU/memory nodes. The two lower-speed PCI Bus ports, E and F, support peripherals. This embodiment provides all of the I/O needs of a basic computer system (for this purpose it may reside on a circuit board which also includes connections not relevant here, such as a Universal Serial Bus controller for support of a keyboard and mouse, SCSI or FiberChannel controllers for hard disk drive support, etc.), or it may provide the I/O needs for booting up larger systems. The four high-speed single-ended ports C, D, 8, 9 are available are not used.

Figure 5:
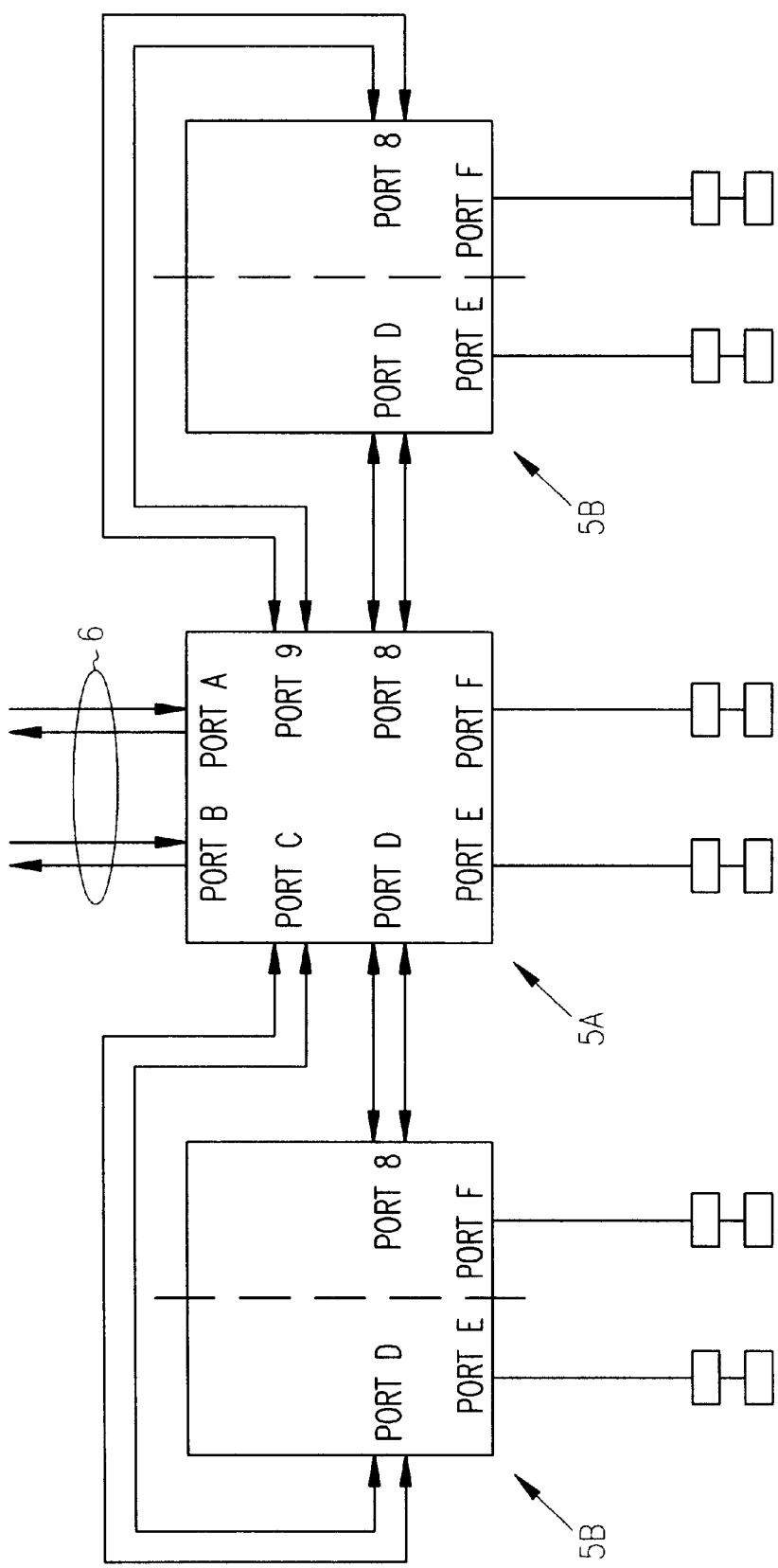

FIG. 5 is a block diagram of the third of three preferred implementations. In this embodiment, three ASICs are used. In any multi-ASIC implementation, there may be only a single point (the Crossbar Switch described in detail below) at which high-speed data from the cpu/memory nodes is allocated among the high-speed ports available within ASIC 5a for transmission to ASICs 5b. Thus, the three ASICs are identical to each other except for the designation of XBridge or SuperBridge Mode for each individual ASIC. A single ASIC, denoted 5a, is in XBridge Mode, and has high-speed differential signalling ports A and B for communication with the CPU/memory nodes, the four high-speed single-ended ports C, D, 8, 9 for communication with other ASICs, denoted 5b, and the two PCI Bus ports, E and F, for the support of peripherals. The additional two ASICs 5b are identical to each other, and each is in SuperBridge Mode. Each SuperBridge ASIC 5b communicates with ASIC 5a through the single ended on board ports, and each supports two PCI buses. As indicated by the dashed line, the PCI buses are segmented and therefore cannot communicate with each other internal to the ASIC (although they can communicate via connections in ASIC 5a). Each of the twelve of the PCI buses are 66 MHz, two slot, buses.

Figure 6:
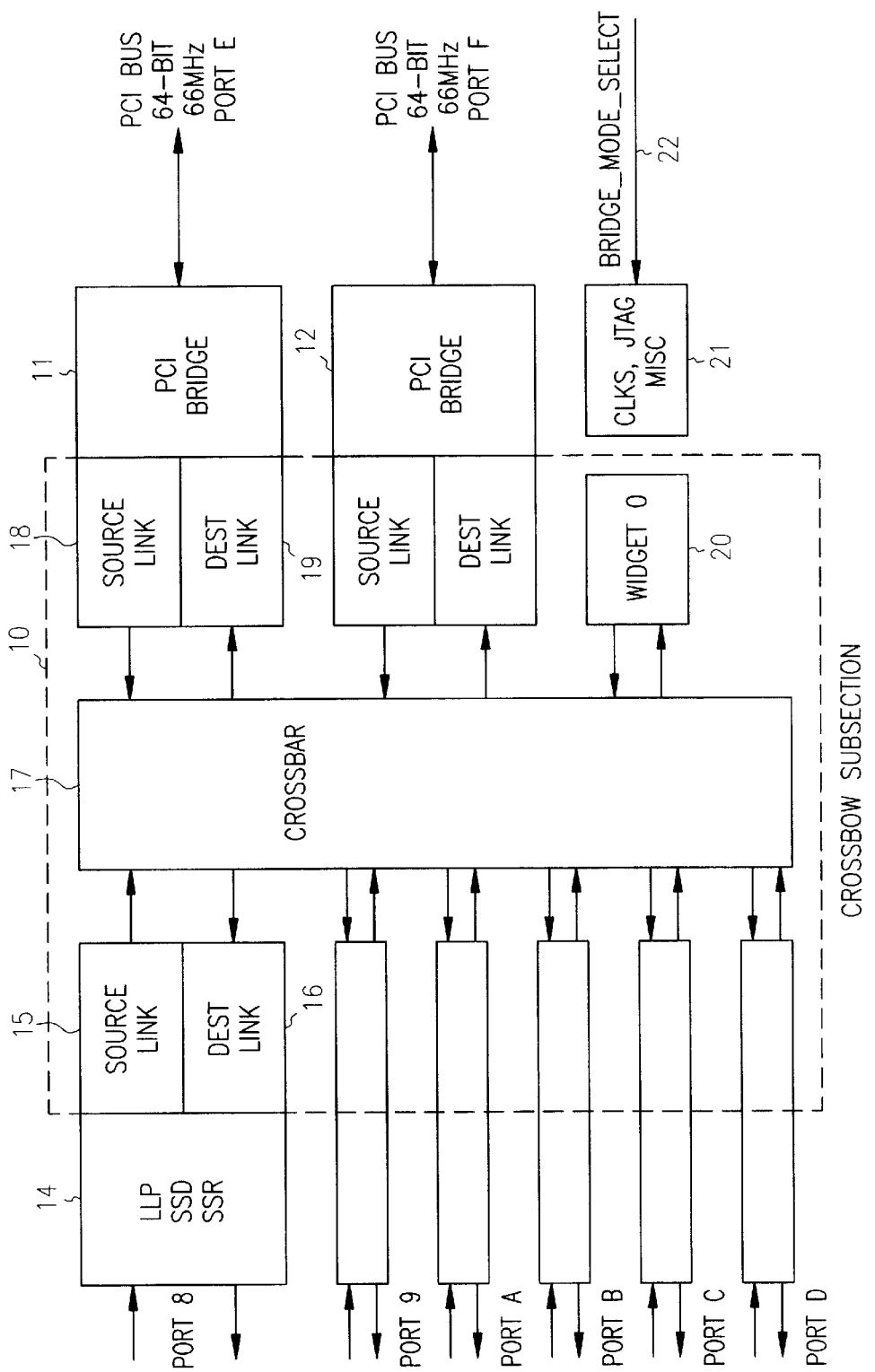
FIG. 6 is a block diagram of the details of a preferred ASIC implementation of the invention.

FIG. 6 is a block diagram of the XBridge ASIC. It comprises the Crossbow 10; two PCI Bridges 11 and 12; and six link level protocol (LLP) modules 14, one for each of the high-speed ports A–D, 8 and 9. Crossbow 10 in turn comprises a source link 15 and a destination link 16 for each of the six high-speed ports; the Crossbar Switch 17; a source link 18 and a destination link 19 for each of the two PCI Bridges; and "Widget 0" (internal registers and error processing circuitry).

Miscellaneous functions also present and indicated as 21 include a JTAG controller for boundary scan capability, clocks, etc. Notable among these functions is the Bridge__Mode__Select feature indicated as 22, which determines whether the ASIC is in XBridge or SuperBridge Mode. The mode selection may be implemented within the ASIC by any convenient means. The preferred means for selecting the mode is enabling/disabling the clock to the Crossbar Switch 17. Disabling the clock in SuperBridge mode reduces the power consumption of the ASIC by approximately 50 percent. Furthermore, when the ASIC is in SuperBridge Mode, both of the low-speed PCI bridges are connected only to external ports.

Figure 7:
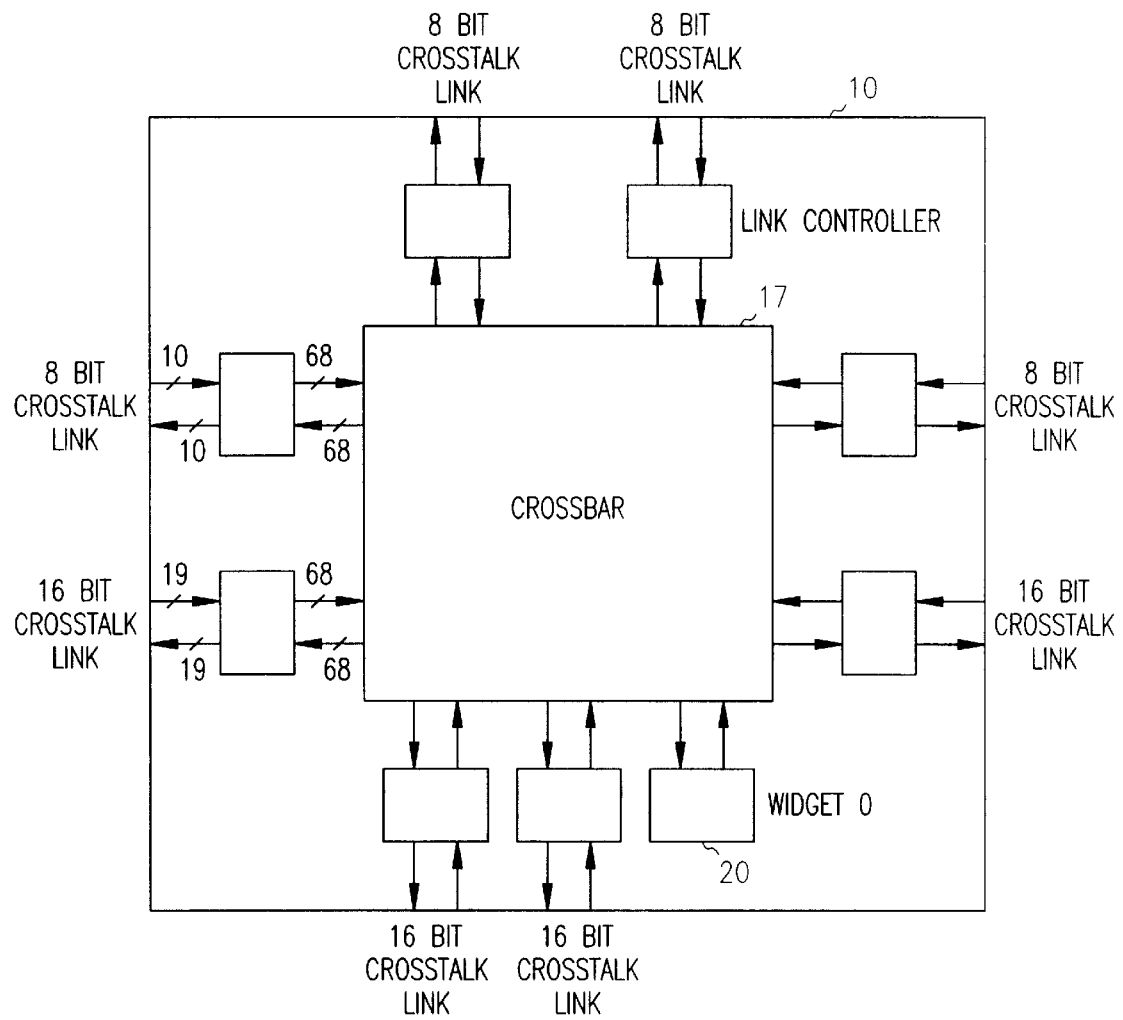
FIG. 7 is a block diagram of the Crossbow subsection of the embodiment of FIG. 6.

FIG. 7 shows a block diagram of the Crossbow subsection 10 of the XBridge ASIC. The core of the Crossbow subsection 10 is the Crossbar Switch 17, a nine port, 68 bit switching circuit. The Crossbow subsection 10 supports six 16 bit links and two links to PCI interfaces. Thus, eight of the nine ports are connected to link controllers (either the six high-speed link controllers 15/16 or two PCI Bridge link controllers 18/19 of FIG. 6). The ninth port is connected to "Widget 0" 20. Each port consists of a 68 bit output bus and a 68 bit input bus. Each bus consists of 64 bits of packet data, 3 bits of sideband data (packet__start, packet__stop, invalid packet), and 1 bit of control information (xbar__data__valid). Data is transferred through the crossbar at a data rate equivalent to that required for a 600 Mbaud 16 bit link. The 8 bit ports contain rate matching buffers which allow them to transmit and receive from the Crossbar at the 16 bit data rate and transmit and receive data on their physical links a half the data rate of the crossbar. The 16 bit ports may be configured to run as 8 bit ports and therefore also contain rate matching buffers. Widget 0 occupies one port on the Crossbow. Widget 0 handles the accessing of registers internal to the Crossbow subsection, and performs error handling. When a link controller detects and error in a high-speed packet, it forwards the packet to the Widget 0 port and the Widget 0 error handling logic updates the necessary registers and issues interrupts if so enabled. All read and write requests of internal registers in the Crossbow subsection are in the form of request packets sent to Widget 0.

The majority of the Crossbow subsection operates from a single 600 MHz clock identified as the core__clock. The two notable exceptions are the high-speed link receivers and link transmitters which are known as the Source Synchronous Receiver (SSR) and the Source Synchronous Driver (SSD), respectively. Each SSD receives a 400 MHz and a 600 MHZ clock which is used internally to the SSD and known as local__150. Each SSR uses a clock which is transmitted with the data.

A link controller has all necessary circuitry to transmit and receive data on the high-speed links, along with all necessary buffers and arbitration logic to control data flow to and from the links. There are essentially two kinds of link controllers, differing based on the size of the link port to which they are connected. An 8 bit port link controller controls traffic on 8 bit links and operates only in 8 bit mode. A 16/8 port link controller may operate in either 8 bit mode or 16 bit mode, thus they may connect to 8 bit or 16 bit widgets.

Figure 8:
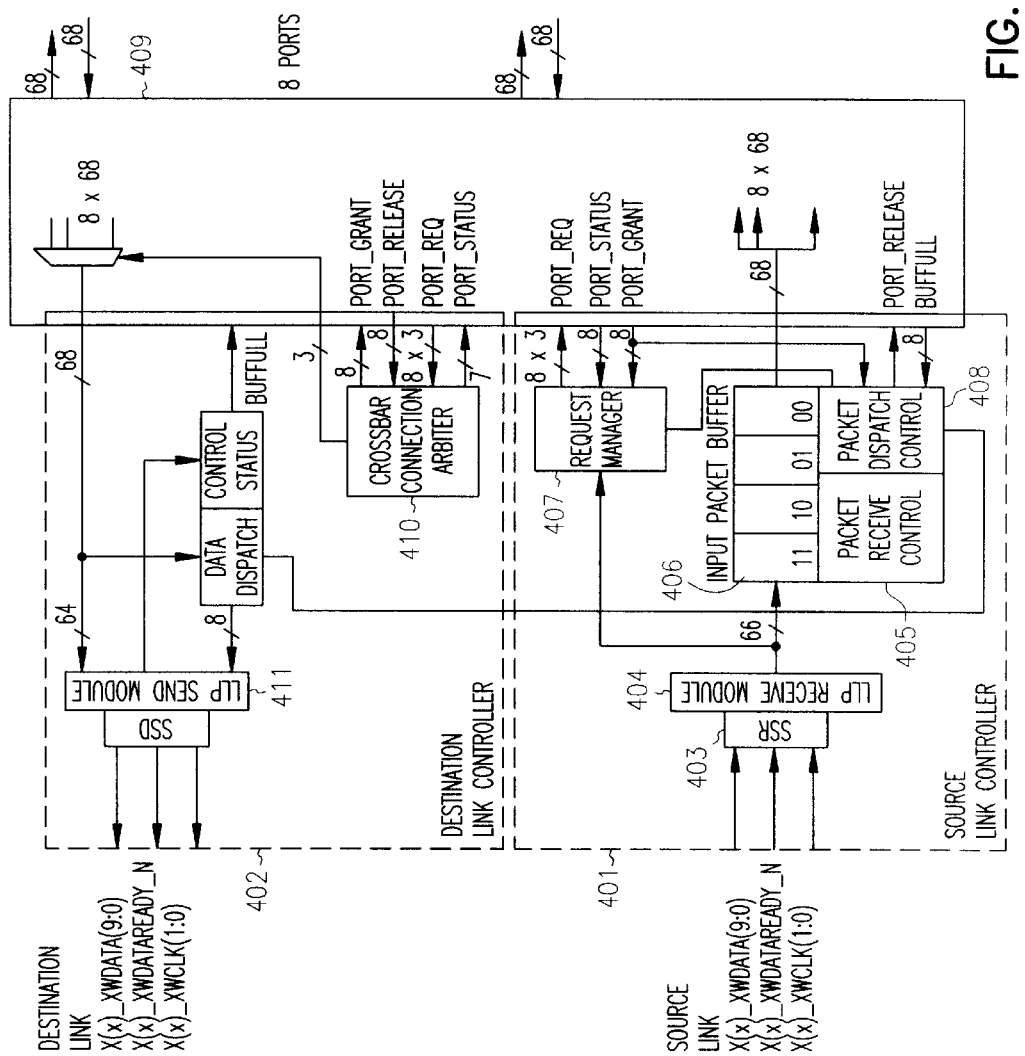
FIG. 8 shows a detailed circuit diagram of a link controller portion of a preferred embodiment of the invention.

FIG. 8 shows a detailed circuit diagram of a link controller. The link controller is divided into two sections, a source link controller 401 and a destination link controller 402. The source link controller 401 handles all traffic between the source link and the switching matrix 403. Packets are transferred on the source link and the data is received by the source synchronous receiver (SSR) 403 and link level protocol (LLP) receive module 404. The data is transferred in micropackets to ensure error-free transmission. Each micropacket contains 128 bits of data, 16 check bits, 4 bits of transmit sequence number, 4 bits of receive sequence number, and 8 bits of sideband information. The SSR 403 receives the narrow, 400 or 600 MHz data stream and transmitted clock. It uses the clock signal to convert the data stream back into a wide, 150 MHz data stream. Hence, the majority of the packet switched router logic is isolated from the high speed links and operates at a 150 MHz core clock frequency. The LLP module regenerates the error check bits from the received data and compares them to the received check bits to ensure that no errors have occurred.

The function of the LLP receive module 404 is to isolate the upper levels of logic in the link controller from the link level protocol. Basically, the SSR 403 and LLP receiver module 404 strips all link protocol information and passes the data to the next stages of logic.

Next, the packet receive control logic 405 scans the sideband data for a "start of packet" code. If this code is received, the control logic 405 begins filling one of the 4input packet buffers 406. The input packet buffers 406 serve two purposes. First, it provides a place to temporarily store a packet when the packet destination is busy. And second, it provides for rate matching between the data stream coming from the LLP and the switching matrix. The packet receive control logic 405 also extracts pertinent information from the command word portions of the packet and places it in the request queue, which is located in the request manager 407. The information written into the request queue defines the packet's destination, priority, and type (i.e., request or response). It is the task of the request manager to determine which packets are eligible for arbitration. While the packet is being received and put into one of the input packet buffers 406, the request manager 407 checks the status of the destination port and the priority of the packets in the queue to determine which of the packets in the input packet buffer 406 has the highest priority. If the packet which has just entered the queue has the highest priority of all packets currently in the queue, it will advance to the front of the queue and enter the arbitration phase. If there are higher priority connection requests already in the queue, it waits until those requests are serviced.

During the arbitration phase, the request manager 407 sends a connection request (port~req) to the destination link controller associated with that packet's destination. The request manager 407 then alerts the packet dispatch control 408 that a connection arbitration is in progress. When the packet wins arbitration, a port~grant signal is sent back from the destination link controller to the requesting source.

Whereupon, the dispatch controller 408 begins transferring the packet out of the input packet buffer 406 and into the switching matrix 409. The request manager 407 then retires the entry from the request queue. As the dispatch controller 408 is transferring the packet, it also monitors whether the destination can currently accept any more data. When the transfer of the packet nears completion, the dispatch controller 408 releases control of the destination port by asserting the port~release signal. This releases the connection arbiter 410 to start a new arbitration phase and establish a new connection.

Referring still to FIG. 8, the destination link controller 402 handles all packet traffic between the switching matrix and the destination link. In addition, it controls all access to the destination port via the connection arbiter 410.

The connection arbiter 410 is responsible for selecting from among all the source link controllers requesting to establish a connection to its destination port. The arbiter 410 scans all current port~req signals and sends a port~grant signal back to the selected link source controller. It then updates the status of the destination port (port~status). As the port~grant acknowledge is sent, the connection arbiter 410 also schedules switching the switching matrix to coincide with the first data arriving at the destination port from the source link controller. A new arbitration cycle begins when the arbiter 410 receives a port~release signal from the source link controller.

Data is streamed directly from the switching matrix to the LLP Send Module 411. The LLP Send Module 411 contains an internal buffer which is used to perform two functions. First, a portion of this buffer is used for supporting the LLP sliding window protocol. As data is transferred over the link, it is also written into the buffer. If receipt of the data is acknowledged by the receiver, the buffer locations are cleared.

However, if an acknowledgment is not received, the data is retransmitted. In normal operation with packets being received correctly, only a portion of the buffer is used to support this protocol. Second, the remaining location in the buffer is used to rate match between the 1200 Mbyte/sec switching matrix 409 and the 400 or 600 Mbyte/sec 8-bit links. This buffering allows a 16-bit source link controller or an 8-bit source link controller that has accumulated a full packet, to transfer at the full data rate to an 8-bit destination link. Thereby, the source link controller can then go service another destination while the transfer on the destination link is occurring.

Figure 9:
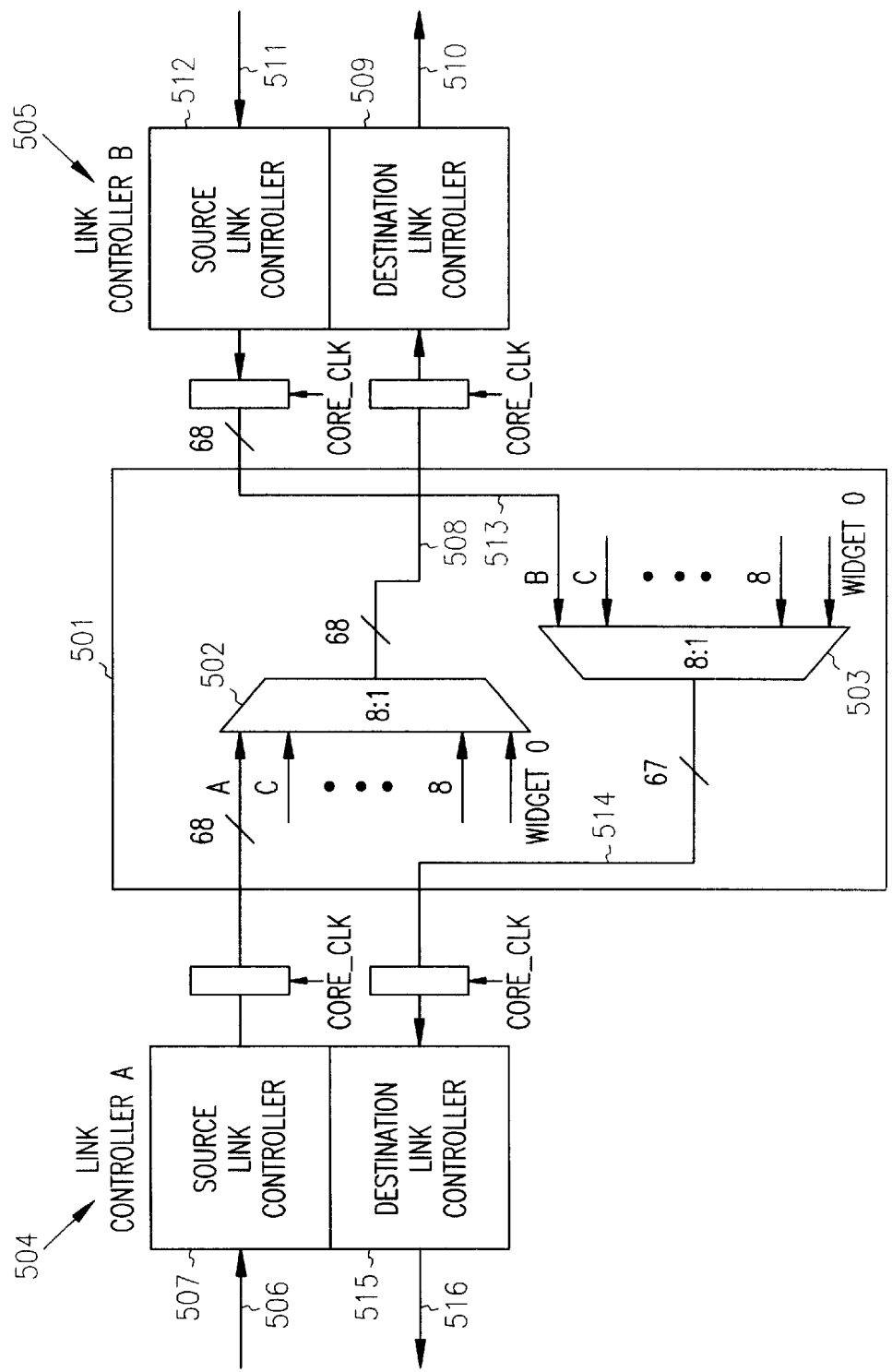
FIG. 9 shows a detailed circuit diagram of a Crossbow portion of a preferred embodiment of the invention.

Returning to the Crossbar switch, there are many different circuit designs which may be used to achieve its functionality. The currently preferred embodiment for the Crossbar is shown in FIG. 9. Crossbar 501 is comprised of nine 68-bit wide 8:1 multiplexers. Any of the source ports can be connected concurrently to any of the destination ports. The switch interconnect is traversed by data in one core clock cycle.

Hence, it is necessary for source link controllers to drive the Crossbar with registered outputs and for the destination link controllers to register the data in. For purposes of illustration, a pair of these multiplexers 502 and 503 are shown for connecting a first link controller 504 to a second link controller 505. Data received on link 506 is passed through the source link controller 507 to line 520 as an input to multiplexer 502. Multiplexer 502 is commanded to select the appropriate input line to be connected to the output line 508.

This causes the data to eventually be input to the destination link controller 509 and out to a port on link 510. Likewise, data on link 511 is input to the source link controller 512.

The data is then processed by the source link controller 512 and sent as a input on line 513 to multiplexer 503. Multiplexer 503 is commanded to select the appropriate input lines 513 and establish a connection to the appropriate lines 514 for input to the destination link controller 515. Thereby, the destination link controller 515 processes the received data and sends it out to the destination port via link 516. It should be noted that multiple sets of inputs from each of link controllers are input to each of the nine multiplexers. Thereby, each multiplexer can select which of these multiple inputs is to be connected to its destination link.

Figure 10:
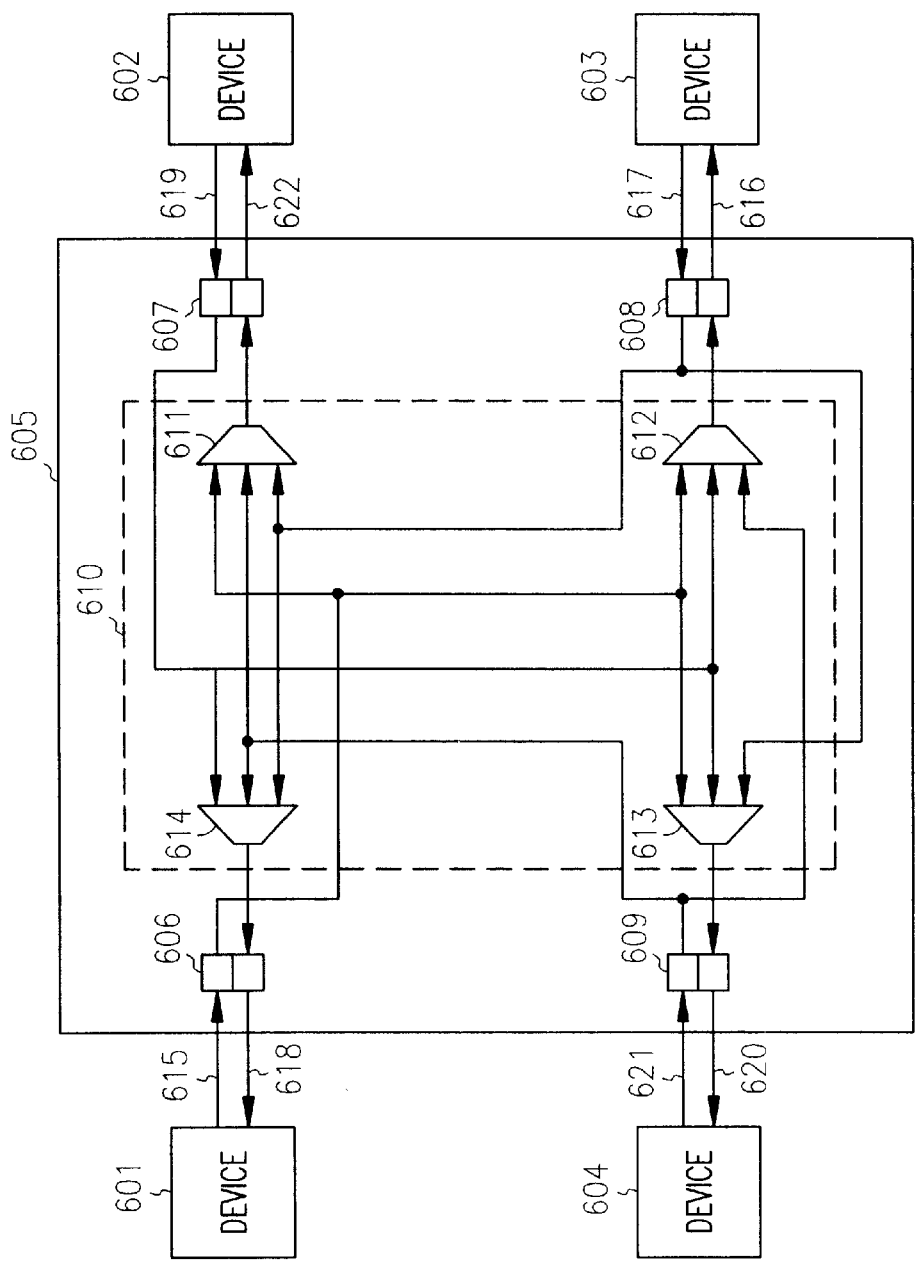
FIG. 10 shows an exemplary switched circuit for providing concurrent communications in one embodiment of the invention.

FIG. 10 shows an exemplary switched circuit for providing concurrent communications. Four separate devices 601–604 are coupled to the packet switched router 605 through four pairs of links. Switched packet router 605 is comprised of four link controllers 606–609 and switching matrix 610. Switching matrix 610 is comprised of four multiplexers 611–614. Each of the multiplexers 611–614 accepts inputs from three source links and outputs to one destination link. These multiplexers can be commanded so that connections may be established from one particular device to any of the other three devices. For example, the output link from device 601 can be connected to destination device 602 via multiplexer 611; destination device 603 via multiplexer 612; or destination device 604 via multiplexer 613. Likewise, the output link from device 603 can be connected to destination device 601 via multiplexer 614; destination device 602 via multiplexer 611; or destination device 604 via multiplexer 613.

In addition, pathways may be established to provide multiple concurrent packet transmissions. For example, device 602 may be connected to device 604 via multiplexor 613. And device 603 may be connected to device 601 via multiplexor 601.

Thereby three separate packets of data may be transmitted concurrently: packet from source device 601 to destination device 602, packet2 from source device 602 to destination device 604, and packet3 from source device 603 to destination device 601. In an alternative embodiment, connections may be established between a single source device and multiple destination devices. For example, device 601 may transmit data to both devices 603 and 604 simultaneously. Conversely, source devices 602, 603, and 604 may all send packets to 601.

Arbitration is accomplished at link controller 606 for the multiple sources sending to device 601. Of course, the circuit can be scaled to accommodate additional devices by adding more links, link controllers, and multiplexers.

Each PCI Bridge subsection communicates to the XBridge core through the High-Speed Receive Processor (H-SRP) and High-Speed Transmit Processor (H-STP) blocks. The H-SRP and H-STP provide link control and buffering of packets sent and received from the Crossbar (XBridge mode) or XIO port (SuperBridge mode). The H-SRP receives packets and transfers them to either the data buffers (response packets) or the request dispatcher (request packets). The H-STP gathers responses and bus-generated requests and transmits them to other widgets.

Figure 11:
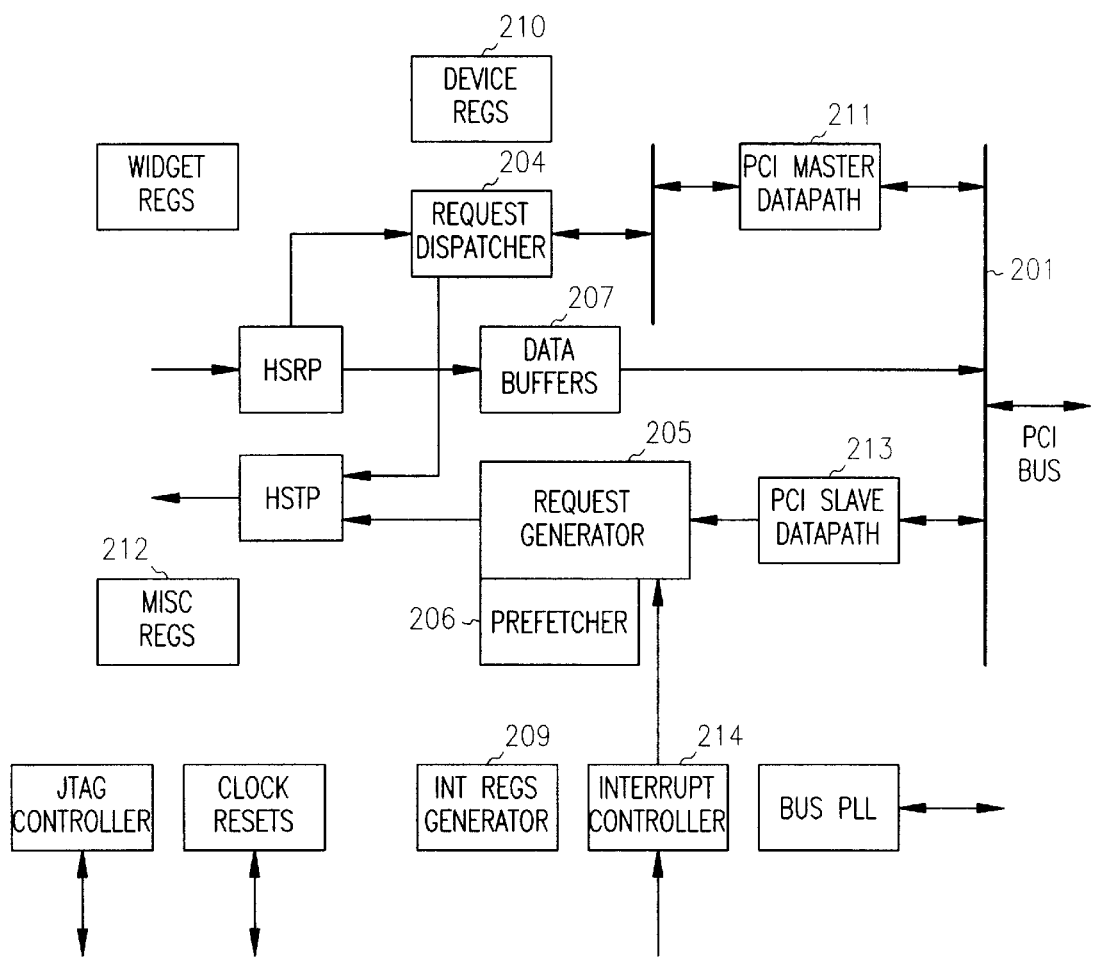
FIG. 11 shows a detailed block diagram of a preferred embodiment for the bridge portion of the invention.

FIG. 11 shows a detailed block diagram of the currently preferred design for the bridge. The PCI Local Bus 201 is a 32-bit or 64-bit bus with multiplexed address and data lines. The synchronous bus can operate at a speed up to 66 MHz in burst mode, which provides a very high host/memory to peripheral transfer rate. The bus is processor independent and devices are configurable by the host. PCI devices can act as a bus master to transfer data to and from the host or they can access other local PCI devices or devices elsewhere in the system. A large number of third party high performance, low cost peripheral devices conform to the PCI standard, therefore the user of the system may choose from them to provide desired functionality and I/O throughput.

The request dispatcher 204 decodes and distributes all incoming requests to the different functional units. It is also responsible for returning the response from those requests, providing any address translation, and error checking. The high-speed to PCI bus translation mechanism consists of generating a PCI bus address from the high-speed address. This translation occurs using fixed regions defined in device slot space and auxiliary I/O space. The request generator 205 is responsible for request packet generation, address translation, and response buffer management. The request generator translation mechanism uses two mapping techniques, a direct map scheme for a portion of system memory and a page mapped scheme for the rest. The direct map scheme uses internal registers and predefined areas to perform mapping. The page map scheme uses a Page Mapping Unit (PMU) to perform address translation on a page basis. To speed up the read access performed by the PCI devices to data residing across the high-speed interconnect, the prefetcher circuit 206 decides whether to prefetch more data following the current address. This enables faster read response time when sequential reads are performed by the PCI I/O devices.

Data buffers 207 provide speed and data buffering between the high-speed interconnect and PCI circuits. They offloads read/write packets from the high-speed, non-stallable bus to the lower performance, two-way handshaking PCI bus 201.

Eight external active low interrupt pins from each PC1 bus are connected to the XBridge. The assignment of the pins is not predefined. All interrupt drivers should be open drain or open collector so that multiple devices can drive the same XBridge pin or one device can have multiple interrupt pins to report different cases. Any time there is a change on an interrupt pin, XBridge reports that to the host via a double word write packet. Reporting the low to high transition of the active low pins can be individually disabled. Each PCI subsection in XBridge will also send interrupts to the host when some abnormal conditions occur on the high-speed bus or PCI Bus. Each interrupt condition is individually enabled or disabled by the host. The XBridge reports all the interrupt activities to the host while they are enabled. The XBridge does not maintain local interrupt priority and no interrupt condition can prevent the reporting of other interrupts.

The internal registers 209 in the Bridge reside in a Switched packet router address region known as "widget space". Every widget has a 16 MByte widget space located in system address space based on widget id number. The Bridge ASIC can occupy any widget id number from 0x1 through 0xf. All registers in the Bridge are 32-bits or less in size and are aligned to a double-word boundary. The registers are located on data bits 31:0 of the double word. The registers can be accessed by Switched packet router double-word packet type with 4 data enables only (32-bit load/store only). Access by other packet type results in an address error exception. There are two device registers 210 for each of the eight devices on the PCI bus, one register for read response buffer allocation and the other for general control and mapping.

The Bridge ASIC also contains special buffering for two different data paths. The one path is used for operations generated from a widget as a master (pio mode). An example of those operations are such things as load/store operations from the processor. The other path is for operations initiated by a bus master from the PCI bus (dma mode). An example of these operation would be a SCSI DMA. The buffering in the Bridge ASIC allows peak performance on both the PCI buses and the Switched packet router Interconnect. The next few sections define the operational flushing policies, programming and use of the buffers in the ASIC. The widget master buffers consist of a request fifo (in the request dispatcher 204), a request ping-pong (in the PCI master 211), and a response ping-pong buffer (in the request dispatcher 204). These buffers allow smooth flow of request operations through the bridge. The request fifo holds initial requests until the request dispatcher 204 can route the request to the proper section of the Bridge ASIC. This fifo can hold three cache line or quarter cache line write requests or up to fifteen, read or double word write requests. The Bridge automatically handles the packing and proper credit management of smaller packets. If the operation is to the PCI bus, the ping-pong buffer provides an additional two operation buffer. If the operation requires a response, the PCI bus and the SSRAM/FLASH share the ping-pong response buffer.

There are two types of PCI master buffers used in the Bridge ASIC, read response buffers and write buffers. Read response buffers are used to hold the data returned from a read request made by the PCI master or the prefetcher. Write buffers are used to hold the data from a PCI master write operation until it can be sent on the Switched packet router interconnect.

The bridge ASIC contains sixteen read response buffers, split into two groups: the even device group and the odd device group. The read response buffers are hard allocated to a PCI master device by using the even/odd device response buffer registers. The PCI device number is based on which physical bus request/grant pair is used. The Bridge ASIC PCI bus supports eight bus request/grant pairs. To allocate a buffer to a given device, the buffer must have its enable bit and the two most significant bits of the device number set. The LSB of the device number is implied by the use of even or odd read response register. The reason for the even/odd buffer is to reduce the compare logic required. This does limit the maximum number of buffers which can be used with any single bus request/grant pair to eight. In addition, each device can have two virtual request/grant pairs within a single bus request/grant pair. The Bridge ASIC provides three kinds of PCI to Switched packet router request mapping which effect read response buffer operations: precise, non-precise, and prefetched. All read operations require at least one buffer to be allocated to that bus request/grant pair. Those devices which can use multiple buffers, a buffer must be ready to be assigned to the current transaction. If all the buffers for a given device are in use, then the transaction is retried and no information is stored. Since all PCI operations which are retried with no data transfer will be repeated there is no data loss problems.

A precise PCI read operation causes the Bridge ASIC to issue a retry on the PCI bus and generate a double word Switched packet router operation requesting only those bytes selected by the PCI byte enables. The PCI device continues to request the bus and perform the read operation. The Bridge ASIC will continue to issue retries until the response arrives and then the next read operation will provide the requested data. The Bridge ASIC compares exact address and byte enables in this mode. After the read is complete, the buffer is ready for another transaction.

Figure 12:
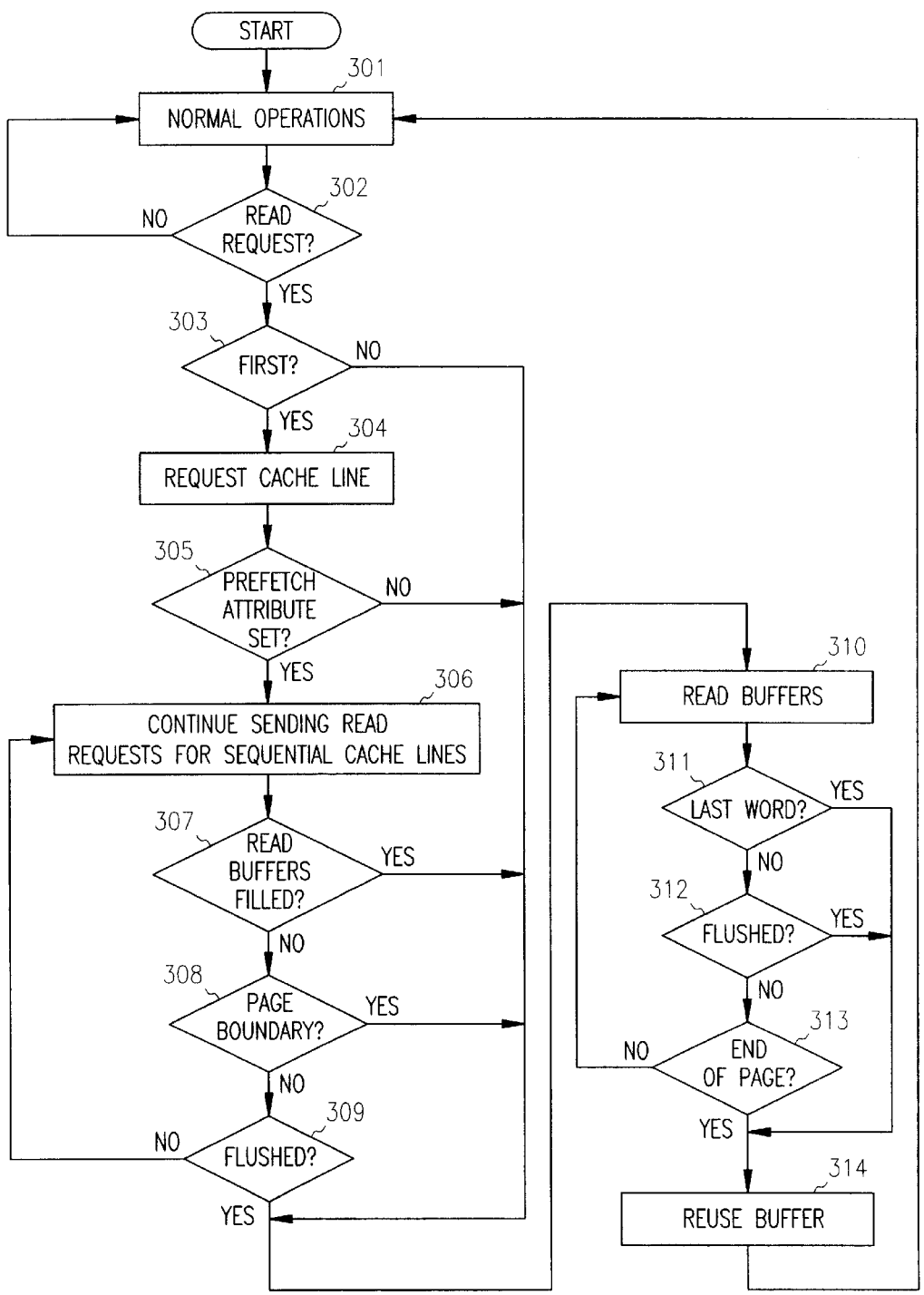
FIGS. 12 and 13 are flowcharts describing the steps for performing operations in preferred embodiments of the invention.

FIG. 12 shows a flowchart describing the steps for performing read operations with pre-fetching. Initially, the computer system performs its routine operations until a read transaction generated from a PCI device is detected, steps 301–302. Thereupon, a determination is made as to whether this particular read request is the first one issued by the PCI device, step 303. If it is not the first read request, then the requested data is retrieved from the read buffers, step 310. Otherwise, for a first read request, a request is made to retrieve an entire cache line from the memory, step 304. A determination is made as to whether the prefetch attribute was set for this particular PCI device, step 305. If the pre-fetch attribute was not selected, the data is retrieved from the read buffers, step 310. Otherwise, sequential cache lines from the memory are loaded into the read buffers, step 306. This process continues until either the read buffers become full (step 308), a page boundary is encountered (step 309), or the buffers are caused to be flushed (step 309). Next, the buffers are read, step 310. Subsequent read transactions can access the same buffers because data had been subsequently prefetched. Subsequent buffer accesses can continue until either the last word has been retrieved (step 311), the buffers are caused to be flushed (step 312), or the end of the page is encountered (step 313). Thereupon, the read buffers can be reused, step 314.

Read response buffers filled by a precise operation are flushed based on the following rules: 1) When a write from the same master and an address match occurs; 2) When an interrupt occurs from a interrupt pin assigned to the device associated with the buffer; 3) Single access to the buffer (normal completion); 4) PCI master write access to 0x3fff_0000 through 0x3fff_fff; and 5) PIO flush.

A non-precise PCI read operation behaves like the precise transaction except that the Bridge ASIC generates a Switched packet router cache line address bits are used for the compare. Accessing the buffer at any address within the cache line provides a response and will continue (bursting) until either the end of the cache line is reached or the PCI cycle is terminated by the master. At this point, the buffer is ready for reuse. Read response buffers filled by a non-precise operation are flushed based on the same rules given above for precise operations.

A prefetched PCI read operation starts similar to the previous operation. First, a retry is issued on the PCI bus; a Switched packet router cache line request is issued, and the prefetcher 206 is enabled for this transaction. The prefetcher 206 stores the next cache line address and looks for addition free buffers currently assigned to the requesting device. If additional assigned buffers are free, then the prefetcher 206 will launch incremental cache line read requests until all the buffers are in use. The prefetcher 206 can be enabled to stop at either a 4K or 16K page boundary. The prefetcher 206 will continue to search for free buffers and posting read request until either a page crossing or a flush condition is reached. The prefetcher 206 can only increment linearly on physical addresses. Prefetched reads also effect when a buffer is available for the next transaction. Both the precise and non-precise operation only allow a single bus tenure to access the buffer then the buffer free for use in the next transaction. The prefetched buffer allows multiple bus tenures to access the buffer until the last (most significant word) single/double word is accessed (32-bit/64-bit bus). With the last access, the buffer is ready for another transaction. In the currently preferred embodiment, the Bridge is optimized for a burst length of 128 byte boundary. The cache line size on this machine is 128 bytes. By doing transfers that are exactly one cache line the cache coherency operations are much more efficient. The memory system is also optimized for blocks of this size and alignment. Other size transfers will work, but they will not be as efficient.

Read response buffers filled by a prefetch operation are flushed based on the following rules: 1) When any non-sequential read is performed by the PCI master (breaking stream); 2) When a write from the same master occurs; 3) When an interrupt occurs from a interrupt pin assigned to the device associated with the buffer; 4) Access to the last word of data in the buffer (normal completion); 5) PCI master write access to 0x3fff_0000 through 0x3fff_ffff; and 6) PIO flush.

Now, the PIO(Processor) Flush operation is discussed. The read response buffers can be cleared with a PIO by setting the corresponding enable bit in the even/odd read response buffer registers 212 to zero, then checking the read response buffer status register. If the RRB_INUSE bit is set then, one must wait until the RRB_VALID bit is set and the RRB_INUSE bit is clear. A PIO to the corresponding RRB_CLEAR bit clears the buffer. If both the RRB_VALID and RRB_INUSE are clear then the buffer is cleared. This is also the mechanism used to reassign buffers "on the fly" to other devices. When a buffer is clear and disabled, it can be reassigned to another device.

From the above rules of operation for the read response buffers, a single PCI master device could have either a single prefetch stream, or multiple random precise/non-precise requests equaling the number of buffers allocated. This functions well for some devices, but others (e.g., SCSI controllers) may have a large data stream which uses the prefetch feature and an occasional dma descriptor read to an unrelated address. Using the above rules, the data stream is flushed on every descriptor read. This will negativity impact performance. It is for cases like these, that the virtual request feature solves. To use this feature, the PCI master must be able to generate 64-bit PCI addresses. The Bridge uses PCI address bit 57 to differentiate between the virtual read streams. The even/odd read response buffer registers have a bit for each buffer to select virtual buffer. This bit is compared against address bit 57 in selecting or clearing the buffers.

Unlike the read response buffers, the seven write buffers residing within the PCI slave datapath 213, are dynamically allocated by the PCI slave logic. This allows the maximum performance for the minimum amount of buffer ram. The Bridge ASIC supports a dual ring arbitration scheme, allowing PCI devices to be either real-time or not. Any non-real time device must leave two write buffers free at all times. If a write occurs and only two buffers are free, then the write is retried until more buffers are free. Any real time device cannot use more than five buffers at a time, and must leave at least one free if it already has write buffers in use.

These rules apply to all cache line aligned transfers. Non-aligned transfers must be broken up into quarter cache transfers (on the Switched packet router interconnect) or write gathered. PCI devices which are not able to burst an entire 128 byte cache might use write gathering mode on the write buffers. By setting the write gather bits in the device (x) registers, when a write occurs, the data is gathered into larger units to be sent on Switched packet router. A PCI device can only have a single write gather buffer in use at one time.

Figure 13:
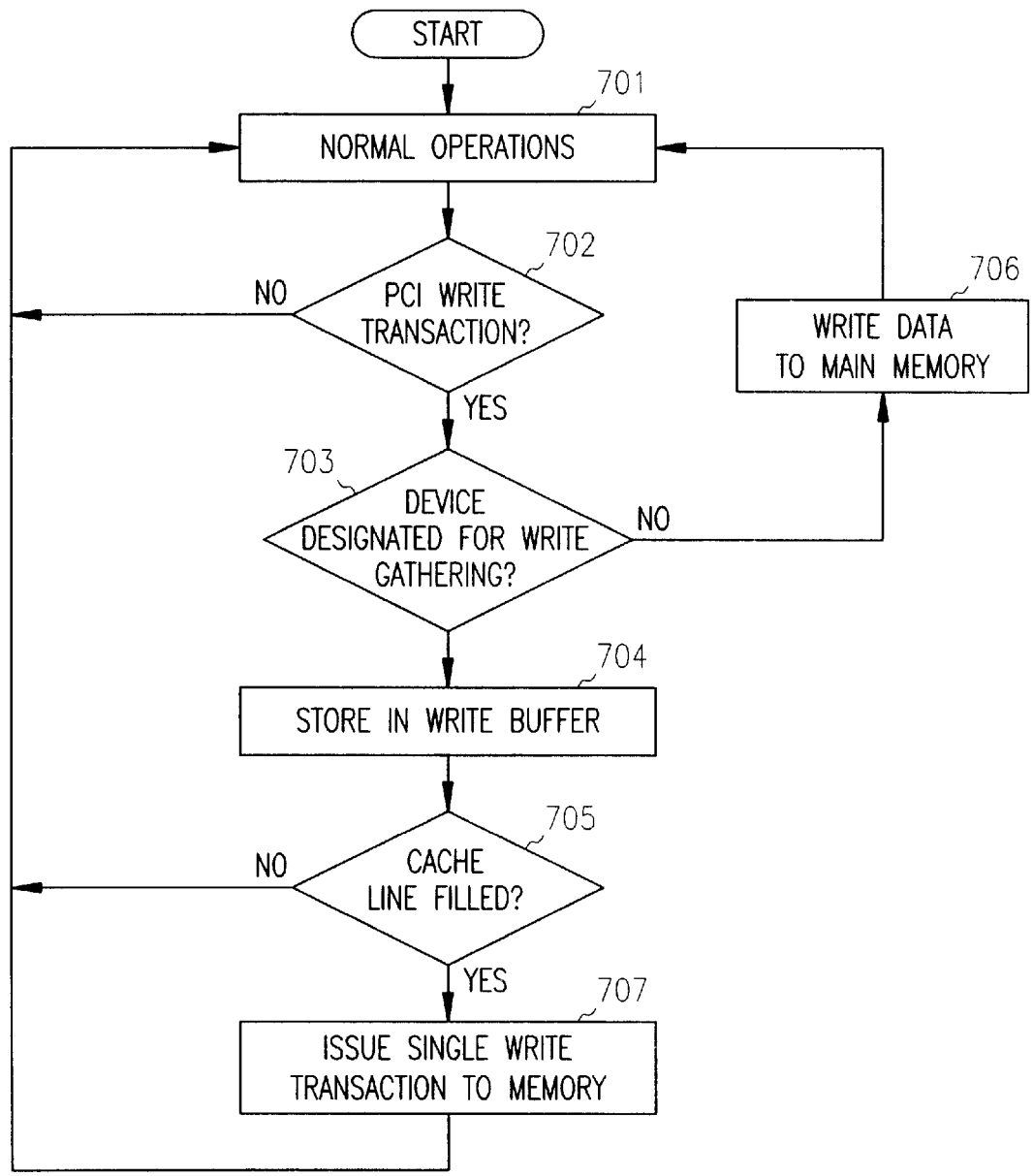

FIG. 13 shows a flowchart describing the steps for performing write gathering. Initially, the computer system performs its routine operations until a write transaction generated from a PCI device is detected, steps 702. Thereupon, a determination is made as to whether that particular PCI device has been designated for write gathering, step 703. If it has not been selected to be write gathered, the data is written to the main memory via the bridge, step 706. Otherwise, the data to be written is stored in the write buffers, step 704. At that point, step 705 determines whether a cache line has been filled. If an entire cache line is full of data, a single write transaction to the main memory from the bridge is executed, step 707. Normal operations continue, step 701.

Flushing of the write buffers is done when the following occurs: 1) A read from the device corresponding to the gather buffer; 2) A non-contiguous write; 3) An interrupt from the interrupt pins associated with the device; 4) A PIO access to the write request buffer flush register; or 5) PCI master write access to 0x3fff_0000 through 0x3fff_ffff. In the currently preferred embodiment, the interrupt controller 214 (FIG. 11) can also influence the buffer flush management for a device. When a device finishes transferring data to or from the Bridge, there may be partially filled data in the write gathering buffer or unused prefetched data in the read buffer. The device can initiate an interrupt or do a memory write to specified address to flush the buffer and invalidate all the data in those buffers which are assigned to the device. If the device uses an interrupt pin to flush/invalidate data buffers, the interrupt packet will be sent after the data. The interrupt pins must be assigned to each device using the interrupt device register. Multiple pins can be assigned to a single device.

The memory latency issue is now described in further detail. As described above, the Bridge ASIC connects the PCI bus to the system bus. The system bus then connects to main memory. This means that the latency to main memory is longer than in a computer whereby the PCI bus is directly connects to main memory. By not connecting the PCI bus directly to the main memory, a computer can have multiple PCI buses, and the total I/O bandwidth of the system is not limited to the bandwidth of a single PCI bus.

To mitigate this longer memory latency, the Bridge can prefetch data from memory. When a PCI device first issues a read the Bridge will retry the read since it does not have any data for the read. Then the Bridge will send a request for a cache line, 128 bytes, to the destination. If the prefetch attribute is set then the Bridge will continue sending read requests for sequential cache lines. If the device is accessing data sequentially, the Bridge will have the data the device is requesting for the next transaction. The Bridge will stop sending requests for more cache lines when it runs out of read buffers assigned to that device, gets to a page boundary, or a condition has occurred that causes the read buffers to be flushed. Conditions that cause the prefetch buffers for a device to be flushed are: a non-sequential read is issued, the device issues a write, software invalidates the prefetch buffers, or the device generates an interrupt. Once the PCI device has read the last word in a data buffer the buffer is reused and the Bridge will send out another read request unless the read buffers have been flushed for some reason or the prefetcher has reached the end of the page.

The Bridge also supports write gathering to make main memory writes more efficient. The write gatherer holds 128 bytes. Each coherent memory write needs to send an invalidate or intervention to the processor. Writes that are less than a quarter cache line boundary will require a read-modify-write sequence to write the data into main memory. For these reasons, the write gatherer tries to convert partial cache line writes into cache line writes to main memory so that they can be handled much more efficiently. The write buffer is flushed when the PCI device issues a read, writes to a non-contiguous address, generates an interrupt, or is flushed by software.

For the first access to a region in main memory, the latency will be very long. If prefetching is used however, sequential accesses should be much faster since the data should be in the Bridge most of the time before the PCI device requests the data. The latency for the first access to a region depends on many factors, such as the priority of the device on the PCI bus, the number of PCI cards installed in the system at the same PCI priority; and the number and priority of devices connected to the system bus.

To maximize performance and efficiency of the whole computer, PCI devices should transfer 128 byte blocks that are aligned to a 128 byte boundary. Because the Bridge is optimized for this size transfer, it disconnects when it is the target of a read and gets to a 128 byte boundary even if it has prefetched the next cache line. This also limits a device's time on the bus to approximately 1 microsecond (i.e., the time to transfer one cache line for a 32 bit device assuming neither device stalls during the transfer).

During write transactions where the Bridge is the target, the Bridge disconnects at 128 byte boundaries or whenever a PCI device writes only part of a 32 byte aligned block. For example if a PCI device wants to write 67 bytes starting at address 32 with no data being transferred at bytes starting at address 32 with no data being transferred at byte address 68 (using the byte enables), the Bridge accepts the first 32 bytes from byte address 32 to 63 and it will accept the next 31 bytes from address 64 to 95, but then it will disconnect because the second 32 bytes were not contiguous. Only 63 bytes will be transferred even though the master wanted to transfer 67 bytes because the second block of 32 bytes was not contiguous.

It is therefore important that whenever possible a PCI device transfer 128 byte blocks that are aligned to 128 byte boundaries. This is very important when designing the buffering on a PCI device. The loss in efficiency will not only be in the memory system but also in arbitration, getting on and off the bus, and the address cycle to data overhead. Also, because the PCI arbiter is a round robin arbiter, a device in a busy system will have to wait its turn if a transfer takes multiple transactions.

It is also important to understand some of the address attributes that are used by the Bridge. These attributes are used to make transfers more efficient. If the prefetch attribute is set, then the Bridge holds on to data it reads from main memory until the PCI device that requested the data reads a byte or more of the last double word of the cache line, 128 bytes, or it is flushed for some reason. This attribute bit also causes the Bridge to read sequential data before the PCI device requests it. Prefetching is required to achieve any reasonable bandwidth on the PCI bus.

There are two basic types of reads: prefetched and not prefetched. The reads that are not prefetched are used when a small amount of data from sequential addresses is to be read. Prefetched reads are used when a lot of sequential data will be accessed. Read prefetching is required for reads from a PCI device to main memory in order to maintain reasonable read memory bandwidth. When a PCI device tries to read data from main memory which has not already been read by the Bridge, it will terminate the read with a retry. The Bridge will then issue one or more cache line reads to main memory if the prefetch attribute is set. The number of cache lines it will request depends on the number of read buffers software has assigned to that PCI device. There are 16 read buffers that have to be shared by all of the PCI devices. A PCI device can have a maximum of 8 read buffers assigned to it. Some time after the device was issued a retry, it will request the PCI bus again and try the read request again. The Bridge will continue issuing retries until it has the data from memory. Once it has the data, it will transfer the data until the initiator terminates the transfer or when a cache line boundary is crossed, the Bridge will issue a disconnect. The Bridge always disconnects on reads that cross cache line boundaries even if it has prefetched the next cache line of data.

The Bridge will continue issuing read requests to main memory reusing the buffers that the device has read to the end of, until it reaches a page boundary, or an event occurs that causes all of the buffers for that PCI device to be flushed. The page boundary can be programmed to be 4 K or 16 K bytes long.

For write gathering, the Bridge contains seven write buffers that are dynamically allocated. The write gatherer's function is to combine multiple write transactions on the PCI bus into one cache line sized transfer on the system bus. Four of the buffers can be used as write gatherers. Write gathering improves the system efficiency because it reduces the number of cache coherency operations to the processor since one is done for each system bus transaction if the coherency attribute is set and the memory system is optimized for cache line size operations. A PCI device can enable the write gatherer by setting the write gathering by setting the write gathering attribute in the device register. This enables write gathering for all writes that the device does using direct mapped space. A PCI device can only have one write gathering operation in progress at a time. When a PCI device writes to the end of a cache line, the buffer will always be written to memory.

A write buffer gets written to main memory when: 1) The PCI device that owns the write buffer issues a read; 2) The write data is not contiguous in address or the byte enables are not all asserted for each data transfer; 3) An interrupt occurs for the PCI device that owns the write buffer; 4) The processor accesses the write request buffer flush register; or 5) The PCI device writes anything to the region 0x3fff 0000 to 0x3fff fff. The data on the write to this region is dropped by the Bridge.

Another attribute, known as the virtual request attribute, is for PCI devices that wish to have two outstanding prefetched read streams at the same time. Because of the rules of when the prefetch buffers get flushed, two outstanding Streams would just thrash each other without the virtual request attribute. This attribute decouples the two streams so that requests for one stream do not affect the prefetch buffers for the other stream. Hence, the virtual request attribute is for PCI devices that need to have two concurrent prefetched read streams. Because of the rules of when the prefetch buffers get flushed, two outstanding streams would just thrash each other without the virtual request attribute. This attribute decouples the two streams so that requests for one stream do not affect the prefetch buffers for the other stream.

Hence, the virtual request attribute is for PCI devices that need to have two concurrent prefetched read streams. Because of the rules of when the prefetch buffers get flushed, two outstanding streams would just thrash each other. Hence, in light of this shortcoming, the virtual request attribute was implemented. This attribute effectively decouples the two streams so that requests for one stream do not affect the prefetch buffers for the other stream.

The virtual attribute can also support having one read stream and one write stream. Normally, a write will cause all of the prefetch read buffers for that PCI device to be invalidated, but if the read stream and the write stream have different virtual request attributes then the write will not invalidate any of the read buffers with the opposite virtual request attribute unless the cache line address of the read and write are the same. When the write occurs all of the read buffers with the same virtual request attribute will be invalidated. When a PCI device issues a write, the address is compared to the addresses of all of the read buffers owned by that PCI device, including ones with the opposite virtual request attribute and if there are any matches that read buffer is invalidated.

The virtual request attribute is only available for PCI devices that issue dual address cycles. This attribute is not present in the page map or in direct mapped space. This feature can be very useful for any PCI device that requires two unrelated concurrent transfers. When read buffers are assigned to a device the virtual request attribute is also assigned to the buffer.

This description of specific embodiments of the invention is not intended to be exhaustive or to limit the invention to the precise forms disclosed. Many modifications and variations are possible and within the scope of the invention, as defined by the claims that follow and their equivalents.

I claim:

1. A bi-modal peripheral controller for a computer system, comprising:
   a) at least two high-speed buses;
   b) at least one low-speed bus;
   c) a packet switched router of data from a first of the high-speed or low-speed buses to a second of the high-speed or low-speed buses, comprising a plurality of communication paths permitting simultaneous multiple communications between any of the high-speed or low-speed buses;
   d) a bridge coupled between the router and each low-speed bus;
   e) a plurality of write buffers, coupled to each bridge, which couple a plurality of write transactions on the low-speed bus coupled to that bridge into a cache line sized transfer to the router;
   f) a plurality of read buffers, coupled to each bridge, in which each read buffer stores fetched data according to a read request from a device connected to the low-speed bus coupled to that bridge so that the device can access the read buffers multiple times to retrieve the data;
   g) a prefetcher, coupled to each bridge, which reads sequential cache lines until the read buffers are full, a page boundary is encountered, or the read buffers are caused to be flushed, if the device connected to the low-speed device coupled to that bridge generates a read request and there is no corresponding data contained in the read buffers; and
   h) means for selecting between first and second modes, in which the first mode permits the router to connect any high-speed bus to any other bus, and the second mode permits the router to connect high-speed buses only to low-speed buses.

2. The peripheral controller of claim 1, in which the means for selecting between first and second modes comprises enabling or disabling a clock to the packet switched router, such that when the clock is disabled each bridge coupled to a low-speed bus is directly connected to a high-speed bus.

3. The peripheral controller of claim 1, in which at least one of the high-speed buses employs differential signaling and at least another of the high speed buses does not.

4. In a computer system, at least one bi-modal peripheral controller comprising:
   a) at least two high-speed buses;
   b) at least one low-speed bus;
   c) a router of data packets, using routing information obtained from the data packets to route the data packets from a first of the high-speed or low-speed buses to a second of the high-speed or low-speed buses;
   d) means for compensating for memory latency between the low-speed bus and either high-speed bus; and
   e) means for selecting between first and second modes, such that the first mode permits the router to connect any high-speed bus to any other bus, and the second mode permits the router to connect high-speed buses only to low-speed buses.

5. In a computer system, at least one bi-modal peripheral controller comprising:
   a) at least two high-speed buses;
   b) at least one low-speed bus;
   c) means for routing packet switched data from a first of the high-speed or low-speed buses to a second of the high-speed or low-speed buses;
   d) means for compensating for memory latency between the low-speed bus and either high-speed bus;
   e) means for selecting between first and second modes, such that the first mode permits the routing means to connect any high-speed bus to any other bus, and the second mode permits the routing means to connect high-speed buses only to low-speed buses; and
   in which at least one of the high-speed buses employs differential signaling and at least another of the high speed buses does not.

6. A peripheral controller for a computer system, comprising:
   a) a plurality of bi-modal ASICs,
   b) at least two high-speed buses;
   c) at least one low-speed bus;
   d) a packet switched data router configured to route data packets from a first of the high-speed or low-speed buses to a second of the high-speed or low-speed buses;
   e) means for compensating for memory latency between the low-speed bus and either high-speed bus; and
   in which one ASIC is in a mode that permits the router to connect any high-speed bus to any other but using routing information obtained from the data packets, and all other ASICs are in a mode that permits the router to connect high-speed buses only to low-speed buses using information obtained from the data packets.

7. A peripheral controller for a computer system, comprising:
   a) a plurality of three identical bi-modal ASICs,
   b) at least two high-speed buses;
   c) at least one low-speed bus;
   d) means for routing packet switched data from a first of the high-speed or low-speed buses to a second of the high-speed or low-speed buses;
   e) means for compensating for memory latency between the low-speed bus and either high-speed bus;
   in which one ASIC is in a mode that permits the routing means to connect any high-speed bus to any other bus, and all other ASICs are in a mode that permits the routing means to connect high-speed buses only to low-speed buses.

8. A peripheral controller for a computer system, comprising:
  a) a plurality of bi-modal ASICs,
  b) at least two high-speed buses;
  c) at least one low-speed bus;
  d) means for routing packet switched data from a first of the high-speed or low-speed buses to a second of the high-speed or low-speed buses;
  c) means for compensating for memory latency between the low-speed bus and either high-speed bus;
  in which one ASIC is in a mode that permits the routing means to connect any high-speed bus to any other bus, and all other ASICs are in a mode that permits the routing means to connect high-speed buses only to low-speed buses; and
  in which at least one of the high-speed buses employs differential signaling and at least another of the high speed buses does not.

* * * * *